(12) United States Patent
André

(10) Patent No.: US 12,136,994 B2
(45) Date of Patent: Nov. 5, 2024

(54) METHODS AND APPARATUSES FOR WINDOWING-BASED CHANNEL FILTERING IN AN OFDM-BASED COMMUNICATION NETWORK

(71) Applicant: Telefonaktiebolaget LM Ericsson (publ), Stockholm (SE)

(72) Inventor: Tore André, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 17/914,909

(22) PCT Filed: May 25, 2020

(86) PCT No.: PCT/SE2020/050528
§ 371 (c)(1),
(2) Date: Sep. 27, 2022

(87) PCT Pub. No.: WO2021/154134
PCT Pub. Date: Aug. 5, 2021

(65) Prior Publication Data
US 2023/0327793 A1 Oct. 12, 2023

(51) Int. Cl.
*H04J 11/00* (2006.01)
(52) U.S. Cl.
CPC ................. *H04J 11/0023* (2013.01)
(58) Field of Classification Search
CPC ......... H04J 11/0023; H04B 2001/1045; H04B 1/1036; H04B 1/109; H04L 27/2647
See application file for complete search history.

(56) References Cited

U.S. PATENT DOCUMENTS

| 6,118,758 A | 9/2000 | Marchok et al. |
| 11,050,449 B1 * | 6/2021 | Pekoz ............... H04L 25/03834 |

(Continued)

OTHER PUBLICATIONS

Ericsson, "Further elaboration on multiple numerologies", 3GPP TSG-RAN WG4 #83, R4-1704949, Hangzhou, China, May 15-19, 2017, 1-3.

(Continued)

*Primary Examiner* — Sophia Vlahos
(74) *Attorney, Agent, or Firm* — Murphy, Bilak & Homiller, PLLC

(57) ABSTRACT

Disclosed is a method and an apparatus for handling signals in an OFDM-based communication network (100) received at a receiver (120). The method comprises obtaining a signal in time domain, the signal comprising a payload signal sent from a transmitter (110) towards the receiver (120) as well as an interference signal, the payload signal residing in a first frequency band and the interference signal residing in a second frequency band outside the first frequency band. The method further comprises separating the payload signal from the interference signal using a filter, and processing (208) the payload signal with a time window (W, $W_p$), or the separated interference signal with a time window, (W, $W_i$), or processing both the separated payload signal with a window (W, $W_p$) and the obtained signal with a window (W, $W_i$), the window (W, $W_p$, $W_i$) being substantially an OFDM symbol wide, so as to achieve a output signal/first output signal comprising the payload signal and a time-windowed interference signal and/or a second output signal comprising the interference signal and a time-windowed payload signal. The windowed signals become attenuated by the FFT so that the wanted signal are achieved undisturbed.

19 Claims, 9 Drawing Sheets

(56) References Cited

U.S. PATENT DOCUMENTS

2004/0062317 A1     4/2004   Uesugi et al.
2009/0116592 A1*   5/2009   Namba ............... H04L 25/0232
                                                                                   375/344
2018/0352556 A1* 12/2018   Loehr ..................... H04L 43/16

OTHER PUBLICATIONS

Ericsson, "On spectrum utilization and considerations for filtering and windowing", 3GPP TSG-RAN WG4 #82bis, R4-1703083, Spokane, Washington, USA, Apr. 3-7, 2017, 1-5.

Huawei, et al., "Discussion on impact on Rx tiltering", 3GPP TSG RAN WG4 Meeting #82, R4-1701318, Athens, Greece, Feb. 13-17, 2017, 1-3.

Peköz, Berker, et al., "Extensionless Adaptive Transmitter and Receiver Windowing of Beyond 50 Frames", IEEE Transactions on Vehicular Technology, vol. XX, No. XX, 2019, 1-15.

Sjöberg, F., et al., "Asynchronous Zipper [subscriber line duplex method]", IEEE International Conference on Communications, vol. 1, https://doi.org/10.1109/ICC.1999.767928, 1999, 231-235.

\* cited by examiner

METHODS AND APPARATUSES FOR WINDOWING-BASED CHANNEL FILTERING IN AN OFDM-BASED COMMUNICATION NETWORK

TECHNICAL FIELD

The present disclosure relates generally to methods and apparatuses of a receiver for handling signals in an Orthogonal Frequency Division Multiplex, OFDM, -based communication network. The present disclosure further relates to computer programs and carriers corresponding to the above methods and apparatuses.

BACKGROUND

In communication networks, any interference added in a communication link or from communication equipment, such as transmitters and receivers, needs to be suppressed outside the used bandwidth in order to transmit and receive a payload signal that is as undisturbed as possible. A payload signal is a signal comprising traffic data or control data that is to be sent from a transmitter to a receiver. Interference may for example be a signal transmitted by another transmitter at a different frequency than the payload signal and that interferes with the payload signal at the receiver. Even though one of the signals is called interference signal throughout this application it may be the signal that you want to sort out unaffected. That is, interference does not have to be radio interference, but the terminology is also used to distinguish two signals within this application which you want to sort out, one of them is called payload and the other is called interference. Interferences on frequencies outside a carrier bandwidth are today filtered out using frequency filters, aka channel filters. Such a channel filter used is typically a Finite Impulse Response (FIR) filter.

When different numerologies, i.e. carriers with different subcarrier spacing share a single carrier frequency band they will interfere with each other due to that they are not orthogonal. In the receiver the two numerologies will be decoded by separate Fast Fourier Transformation, FFTs. However, if the two numerologies are not separated by filters before entering the respective FFT, they will create interference towards each other. In New Radio (NR) there is a possibility to change numerologies, i.e. subcarrier spacing, based on current traffic demands. It is also possible to have more than one numerology in a carrier at the same time, that is share a single carrier frequency band. Changes of the mix between numerologies can happened very often, up to every time transmission interval, TTI, (≤10 ms). Due to the different symbol length each numerology will require a dedicated FFT in the receiver. Although the numerologies are separated in frequency, they will create disturbance to each other. This is due to that besides the wanted signal, also a symbol from the other numerology will be present in the FFT. The other numerology will have a different symbol length meaning that several symbols or only part of a symbol will also be present in the signal and will not be orthogonal to the wanted signal.

For wireless communication networks, at a wireless transmitter, a purpose of the channel filter is to remove frequency components outside the carrier frequency bandwidth to fulfill a standardized spectrum mask. At the wireless receiver, the purpose of the channel filter is to remove the impact of any disturbers outside the carrier spectrum. The channel filters are sharp filters with hundreds of filter taps (N) meaning they require a lot of calculations. A symmetrical FIR filter with N taps requires (N−1)/2+1 multiplications per sample (if N is odd). Filter lengths for Long Term Evolution (LTE) is typically in the order of 100 taps. For New Radio (NR), which has smaller guard bands, the filter length may be more than double. The filters required to separate different numerologies will need to be quite steep resulting in high computational complexity i.e. many arithmetic operations.

New radio products, such as NR and future radio technologies, will have more antennas than today. Each antenna requires a radio path in the product containing a digital part of a transmitter or receiver, the digital part having digital filters, Crest Factor Reduction (CFR), Digital Pre-Distortion (DPD) and other digital processing units. Previously, the digital parts represented a small part of the total power consumption in a radio product. When going to more antennas each antenna has a lower output power and the digital parts will represent a relatively larger portion of both power consumption and cost. Therefore, it is essential to simplify the digital parts of transmitters and receivers as much as possible. As the channel filters require lots of calculations, it is of interest to reduce the complexity of the channel filters to reduce power consumption and cost.

U.S. Pat. No. 6,118,758 describes a method that reduces complexity of the transmitter channel filters. In a transmitter there are no interferers outside the carrier frequency except at a symbol borders where transients give rise to frequencies outside the carrier. In the receiver however, there are interferers outside the carrier frequency at any time. Therefore, the method of U.S. Pat. No. 6,118,758 is not useable at the receiving side. As shown, there is a need of an improved and cost-efficient way of reducing interference in a received communication signal. More specifically, there is a need for a way of reducing complexity of receiver channel filters when reducing such interference.

SUMMARY

It is an object of the technology here presented to address at least some of the problems and issues outlined above. According to an embodiment, there is a need of a cost-efficient way of reducing interference in a received communication signal. It is possible to achieve these objects and others by using methods, network nodes and wireless communication devices as defined in the attached independent claims.

According to some embodiments from one input signal, comprising two signals one of them called payload and the other called interference signal throughout this application, two separated signals are achieved as output. Both these separated output signals comprise the signal you want to sort out unaffected and the disturbing signal. One of the signals, often the disturbing signal, is windowed and the windowed signals become attenuated by the FFT so that the wanted signal are achieved undisturbed. That is, for each of the two output signals, you may choose which of the signals to call payload corresponding to the signal you want to be unaffected, and which to call the interference corresponding to the signal you want to attenuate. Even though one of the signals is called interference signal throughout this application it may be the signal that you want to sort out unaffected. That is interference does not have to be radio interference, but the terminology is used to distinguish the two signals within this application. In some embodiments you only sort out one output signal comprising the signal you want to sort out unaffected and the other (disturbing) signal attenuated/windowed.

According to one aspect, a method is performed by an apparatus for handling signals in an OFDM-based communication network received at a receiver. The method comprises obtaining a signal in time domain, the signal comprising a payload signal sent from a transmitter towards the receiver as well as an interference signal, the payload signal residing in a first frequency band and the interference signal residing in a second frequency band outside the first frequency band. The method further comprises separating the payload signal from the interference signal using a filter, and processing the separated interference signal with a time window (W), or processing both the separated payload signal with a W and the obtained signal with a W, W being substantially an OFDM symbol wide, so as to achieve an output signal comprising the payload signal and a time-windowed interference signal.

According to another aspect, an apparatus is provided operable in an OFDM-based communication network, configured for handling signals in the communication network received at a receiver. The apparatus comprises a processing circuitry and a memory. The memory contains instructions executable by said processing circuitry, whereby the apparatus is operative for obtaining a signal in time domain, the signal comprising a payload signal sent from a transmitter towards the receiver as well as an interference signal, the payload signal residing in a first frequency band and the interference signal residing in a second frequency band outside the first frequency band, separating the payload signal from the interference signal using a filter, processing (208) the payload signal with a time window (W, $W_p$), or the separated interference signal with a time window, (W, $W_i$), or processing both the separated payload signal with a window (W, $W_p$) and the obtained signal with a window (W, $W_i$), the window (W, $W_p$, $W_i$) being substantially an OFDM symbol wide, so as to achieve a first output signal comprising the payload signal and a time-windowed interference signal and/or a second output signal comprising the interference signal and a time-windowed payload signal.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 5b comprise diagrams over time illustrating signals handled with the apparatus of FIG. 5a.

DETAILED DESCRIPTION

Figure 1:
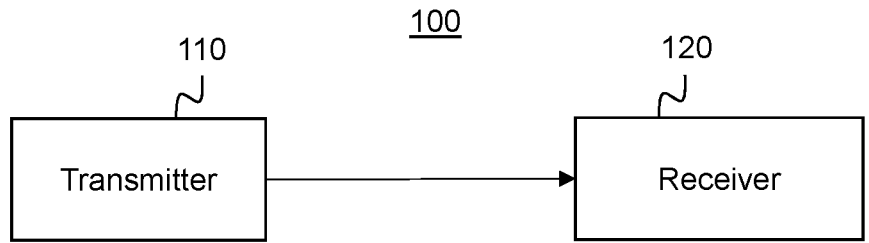
FIG. 1 is a block diagram illustrating a communication network in which the present technology here presented may be used.

Briefly described, a solution is provided to cost-efficiently reduce interference of a payload signal received at a receiver in an Orthogonal Frequency Division Multiplex (OFDM)-based communication network. This is achieved by frequency filtering/separating the payload signal from an interference signal lying in a different band than the payload signal, and thereafter time windowing either the separated payload signal, the separated interference signal, or the separated payload signal and the obtained signal/ the originally received signal comprising both the payload and interference signal, so as to achieve a output signal/first output signal comprising the payload signal and a time-windowed interference signal and/or to achieve a second output signal comprising the interference signal and a time-windowed payload signal. In this application the method of first frequency filtering and thereafter time windowing according to the above is referred to as frequency selective windowing. Even though one of the signals is called interference signal throughout this application it may be the signal that you want to sort out unaffected. That is interference does not have to be radio interference, but the terminology is also used to distinguish two signals within this application which you want to sort out, one of them is called payload and the other is called interference.

The frequency band for the payload signal may belong to a radio access technology (RAT) with a numerology, such as NR or LTE, and the frequency band of the interference signal may belong to a radio access technology with a different numerology. Within a RAT, such as NR, there may also exist different numerologies. Although the numerologies are separated in frequency, they will create disturbance to each other. This is due to that besides the wanted signal, also a symbol from the other numerology will be present in the FFT. The other numerology will have a different symbol length meaning that several symbols or only part of a symbol will also be present in the signal and will not be orthogonal to the wanted signal. For example, two NR signals can have different numerology depending on which service they deliver, or two LTE signals can have different length or different subcarrier spacing. Shared spectrum for NR and LTE is another example where different numerology exists. All these examples my lead to non-orthogonality.

If the disturber is windowed it can be made almost orthogonal to the wanted signal. Windowing means to multiply the time domain OFDM symbol with a predefined window function. The window is typically equal to 1 in the middle part but has a ramp up and a ramp down at the ends. The result of the windowing is that the ends of the disturber is smooth and with less out of band frequency components. It is not desirable to window the wanted payload signal as this will destroy the orthogonality between subcarriers and create Intercarrier interference ICI or error vector magnitude EVM.

By using frequency selective windowing the disturbance in one numerology can be removed without disturbing the other numerology. Assuming there are two different numerologies side by side in a carrier. With a simple scheme it is possible to create two output signals, one with numerology of a payload unaffected but numerology for the interference signal, the disturbing numerology, windowed and another output with the interference numerology unaffected but numerology for the payload windowed. That is, you may choose which of the numerologies to call payload and which to call the interference signal.

When performing a Discrete Fourier Transformation (DFT), such as a Fast Fourier Transformation (FFT), on such output signals, the resulting signal will comprise a substantially unaffected payload signal and the interference signal will be largely attenuated due to the time-windowing. Further, this can be achieved without having to use large filters.

FIG. 1 shows a communication network 100 in which the present technology here presented may be used. The communication network 100 comprises a transmitter 110 that is in, or is adapted for, communication with a receiver 120. The communication network 100 may be any kind of wireless or wireline communication network that is based on OFDM or Discrete Multi-Tone (DMT), which is an OFDM-variant used especially in Digital Subscriber Line (DSL)-based wireline networks. Example of such communication networks 100 are Asymmetric DSL (ADSL), Very high-speed DSL (VDSL), LTE, LTE Advanced, NR aka 5G, Wireless Local Area Networks (WLAN), HIPERLAN (High Performance Radio LAN), Worldwide Interoperability for Microwave Access (WiMAX), WiMAX Advanced, Digital Audio Broadcasting (DAB), Digital Video Broadcasting Terrestrial (DVB-T), DVB Handheld (DVB-H), Integrated Services Digital Broadcasting—Terrestrial (ISDB-T). The technology here presented may be especially useful in NR with mixed numerologies.

Figure 2:
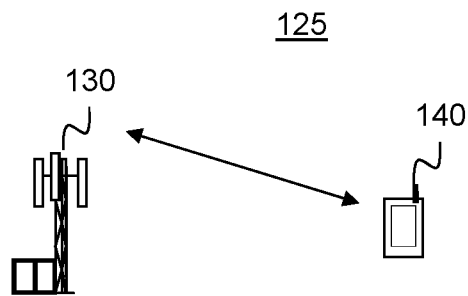
FIG. 2 is a block diagram illustrating a wireless communication network in which the present technology here presented may be used.

FIG. 2 shows a wireless communication network 125 in which the present technology here presented may be used. The wireless communication network 125 comprises a radio access network (RAN) node 130 that is in, or is adapted for, communication with a wireless communication device 140. The RAN node 130 has a transmitter for transmitting wireless signals towards the wireless communication device 140 and a receiver for receiving wireless signals from the wireless communication device 140. Similarly, the wireless communication device 140 has a transmitter for transmitting wireless signals towards the RAN node 130 and a receiver for receiving wireless signals from the RAN node 130. The transmitter and receiver of the RAN node 130 may be collocated in a transceiver, TRX. Similarly, the transmitter and receiver of the wireless communication device 140 may be collocated in another TRX transceiver. When the present technology here presented is used in this network 125, according to one alternative, the transmitter 110 of FIG. 1 is the transmitter of the RAN node 130 and the receiver 120 of FIG. 1 is the receiver of the wireless communication device 140. According to another alternative, the transmitter 110 is the transmitter wireless communication device 140 and the receiver 120 is the receiver of the of the RAN node 130. According to another alternative the RAN node 130 may be in connection with a baseband unit where the technology here presented may be used.

The RAN node 130 may be any kind of network node that provides wireless access to a wireless communication device 140 alone or in combination with another network node. Examples of RAN nodes 130 are a base station (BS), a radio BS, a base transceiver station, a BS controller, a network controller, a Node B (NB), an evolved Node B (eNB), a gNodeB, a Multi-cell/multicast Coordination Entity, a relay node, an access point (AP), a radio AP, a remote radio unit (RRU), a remote radio head (RRH) and a multi-standard BS (MSR BS).

The wireless communication device 140 may be any type of device capable of wirelessly communicating with a RAN node 130 using radio signals. For example, the wireless communication device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 3:
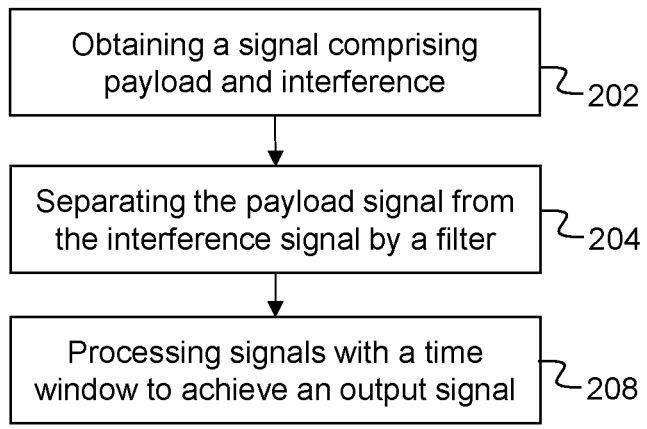
FIG. 3 is a flow chart illustrating a method performed by an apparatus of a receiver, according to possible embodiments.

FIG. 3, in conjunction with FIG. 1, describes a method performed by an apparatus for handling signals in an OFDM-based communication network 100 received at a receiver 120. The method comprises obtaining 202 a signal in time domain, the signal comprising a payload signal sent from a transmitter 110 towards the receiver 120 as well as an interference signal, the payload signal residing in a first frequency band and the interference signal residing in a second frequency band outside the first frequency band. The method further comprises separating 204 the payload signal from the interference signal using a filter, and processing 208 the payload signal with a time window ($W_p$), or the separated interference signal with a time window, ($W_i$), or processing both the separated payload signal with a window (Wp) and the obtained signal with a window ($W_i$), the window ($W_p$, $W_i$) being substantially an OFDM symbol wide, so as to achieve a first output signal comprising the payload signal and a time-windowed interference signal and/or a second output signal comprising the interference signal and a time-windowed payload signal. In the method one may choose and interchange which signal to call payload and which to call interference depending on which signal one wants to achieve as the output signal in the same time as the other signal is attenuated.

By the above method, the obtained signal comprising payload and interference is treated so as to become a output signal, i.e. a first output signal, comprising as payload and interference signal components the payload signal and the time-windowed interference signal, or in some embodiments a first output signal comprising the payload signal and a time-windowed interference signal and/or a second output signal comprising the interference signal and a time-windowed payload signal. When thereafter applying a Discrete Frequency Transformation (DFT) on such a signal, the time-windowed interference signal will be attenuated and as a result a cleaner payload signal is obtained. In embodiments when the interference signal is the signal one wants to sort out, the payload signal is time windowed and attenuated and a clearer interference signal is obtained. The reason for the time-windowed interference signal, or in some embodiments time windowed payload signal, being attenuated when performing a DFT on it is shortly that by windowing the interference signal, or is some cases windowing the payload signal, transients occurring in the beginning and end of the symbol are smoothed and thereby the part of the interference signal in the same frequency spectrum as the payload signal is attenuated, or is some embodiments, part of the payload signal in same frequency spectrum as the interference signal is attenuated.

The method may be applied in wireless communication networks as well as in wireline communication networks. In case of wireless communication, the apparatus may be implemented in a wireless communication device or in a RAN node, i.e. base station. Further, the apparatus may be a part of the receiver. The term "OFDM-based communication networks" also comprises Discrete Multitone (DMT)-based networks. Normally, the method is performed in baseband. This means that the signal obtained in step 202 is obtained in baseband. Also, before step 202 is performed, the time-domain signal is received in radio frequency and transformed from radio frequency into baseband. The separating using a filter 204 is a frequency filtering. The separating using a filter may be performed by letting the frequencies of the first frequency band through and blocking the frequencies of the second frequency band, or vice versa. The separating using a filter may be implemented e.g. as a convolution operation in time domain or as a multiplication operation in frequency domain. The separating using a filter in time domain may be performed by a FIR filter or a Backward forward Zero Phase Infinite Impulse Response (IIR). That is the method of Frequency Selective Windowing could potentially be implemented by IIR filters running the sequence forward and backwards. The filter can also be implemented in frequency domain by first transforming the input signal to frequency domain by an FFT, then multiply the frequency domain signal by the filter frequency response and then go back to time domain using an IFFT. The processing 208 may be processing by multiplying. The time window $(W,W_p,W_i)$ is substantially an OFDM symbol long. The time window $(W,W_p,W_i)$ may according to an embodiment cover a whole OFDM symbol. The window should be as long as the FFT and match the samples that are fed to the FFT.

Figure 8A:
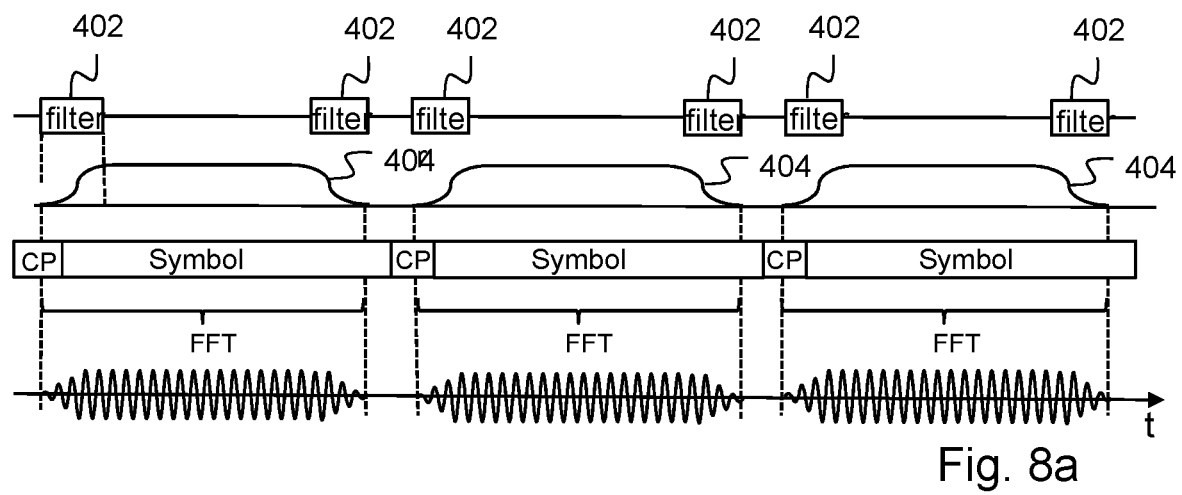
FIG. 8a, 8b and 8c are diagrams over time illustrating actions performed according to embodiments of the technology here presented.
Figure 8B:
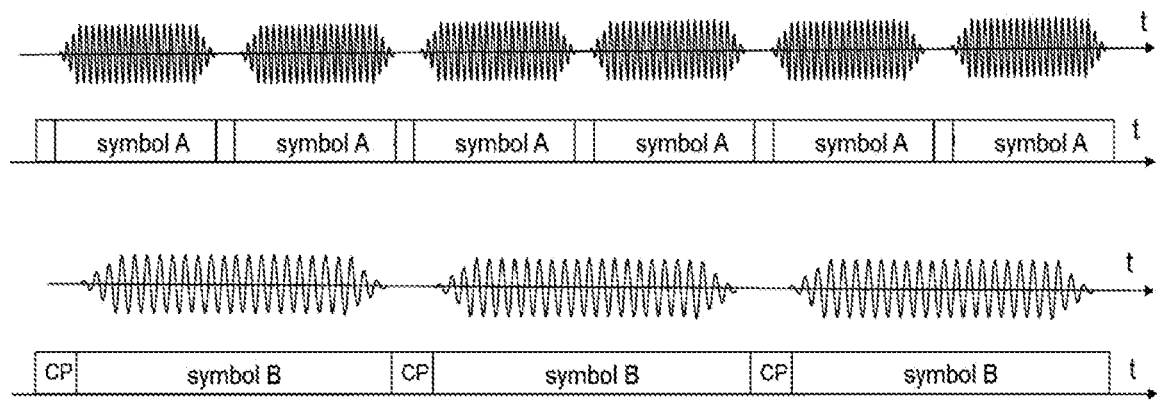

However, according to another embodiment as shown in FIGS. 8a and 8b, $(W,W_p,W_i)$ covers a part of the Cyclic Prefix (CP) before an OFDM symbol and instead skips a part at the end of the OFDM symbol. In such cases the delay caused by using a part of the Cyclic prefix must be compensated for each subcarrier. This is done in OFDM receivers as a standard method not further described in this application. The output signal comprises the separated (payload) signal and a time-windowed (interference) signal but not any other components of the payload signal or the interference signal.

Figure 15:
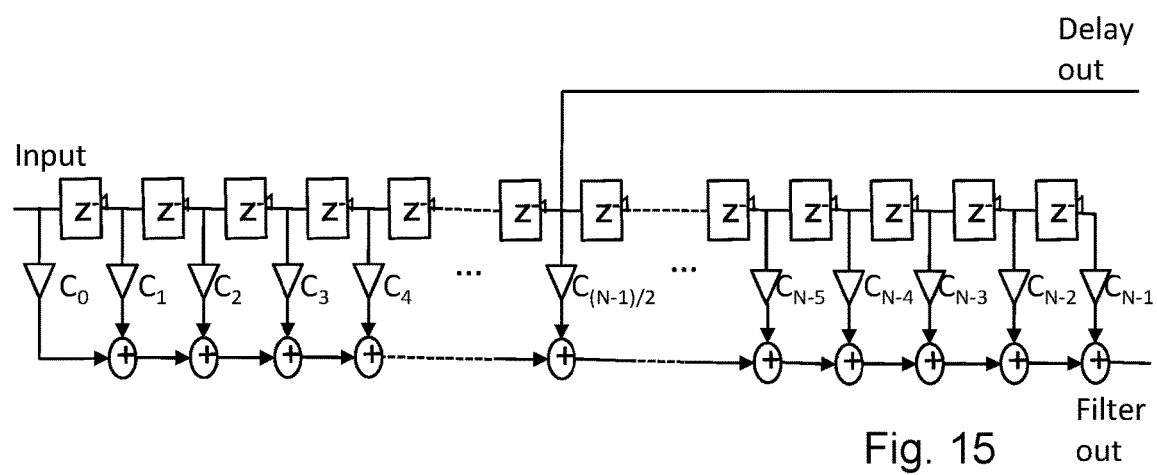
FIG. 15 is a block diagram illustrating a FIR filter.

The delay a filter causes has a relation to half of the filter's length and all the frequencies are delayed as long when passing a filter. The technique in this application uses this fact. No additional filter or extra memories are needed to create the delayed signal. The delayed signal is used to synchronize the obtained signal $s_o$ with the separated signal $s_p$ or $s_i$ 206. By using the existing filter chain, LP and HP-Filter in the figures, which are symmetrical filters consisting of an odd number of filter coefficients, the delayed signal $s_o$ is obtained by taking out the signal $s_o$ from the middle of the filter chain, see "delay out" in FIG. 15. This way $s_o$ is synchronized with the separated signal $s_p$ or $s_i$.

The filters required to separate different numerologies by using prior art techniques will need to be quite steep resulting in high computational complexity i.e. many arithmetic operations. Steep filter corresponds to a long filter chain, see FIG. 15 which visualizes a long filter chain. The filters may also need to be able to reconfigure for each new TTI. It might be difficult to reconfigure a filter that is continuously running without creating disturbances. The solution provides a method to do the separation of the numerologies in a way that almost no disturbances occur. This can be done at a much lower complexity, in terms of numerical operations, that using ordinary filters. There are filters in the new solution as well, but they only run during a short period of time. The filters only need to run a fraction of time compared to existing solutions. When using frequency selective windowing the filters need only to run when one of the windows is in its ramp up phase or ramp down phase, that is only at the symbol borders.

Figure 8C:
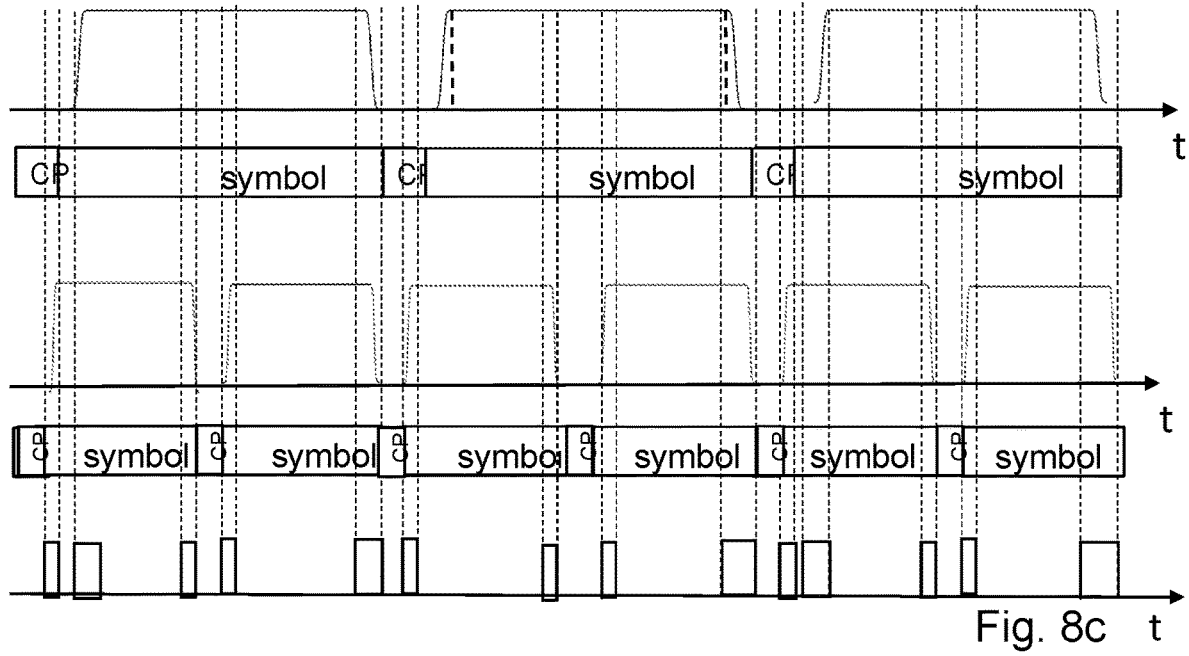

FIG. 8c visualizes, through the grey sections in the bottom of the figure when the filters are used, that is when the windows are in the ramp up and ramp down phases. This means that calculations are saved since the filters only run during these times. It might also be possible to do this with an old radio without support for filtering by doing the low-cost separation in a baseband unit using digital signal processors DSPs. FIG. 9b shows implementing two carriers with different numerologies, two carriers sharing spectrum, see FIGS. 10a, 10b and 11, which are transmitted as the obtained signal over Common Public Radio Interface (CPRI) interface from the Radio unit to the Baseband. The frequency selective windowing could potentially be implemented in a DSP.

Figure 4:
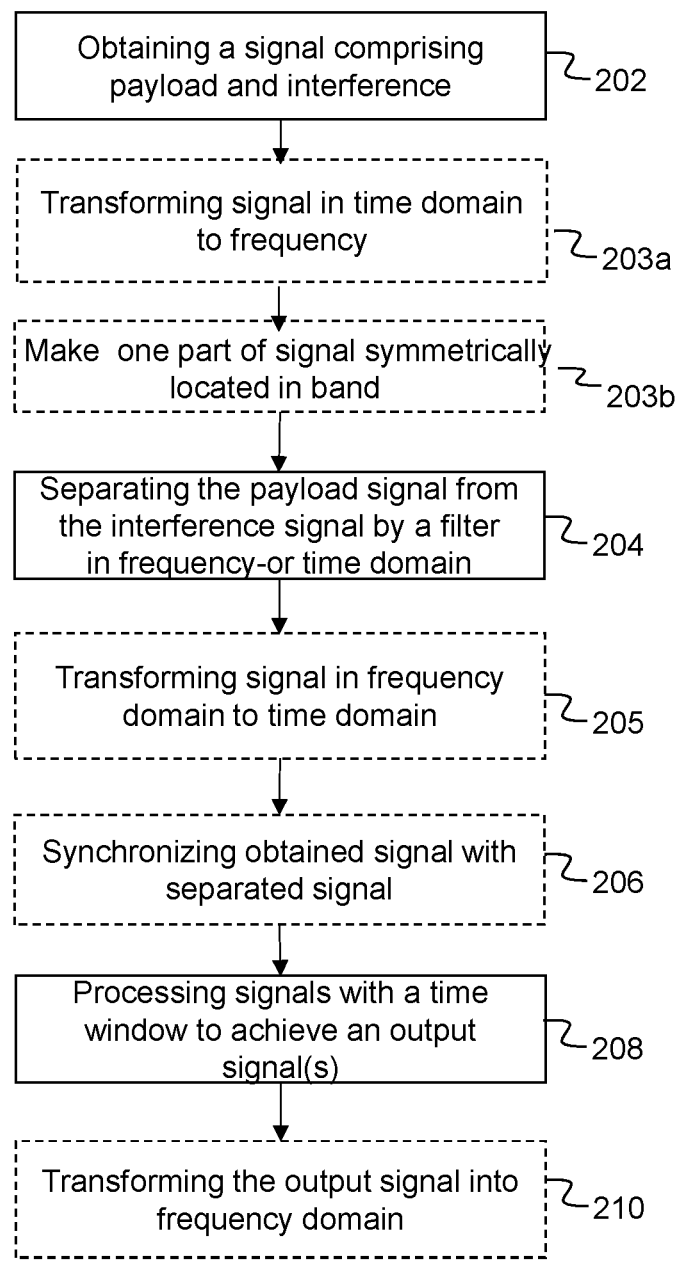
FIG. 4 is another flow chart illustrating methods performed by an apparatus of a receiver, according to possible embodiments.

FIG. 4, in conjunction with FIG. 1, describes embodiments of the above describe method. According to one such embodiment, the method further comprises transforming 210 the output signal from time domain into frequency domain by applying a DFT to the output signal. In this embodiment, the apparatus performing the method may be a part of the receiver 120 or the apparatus performing the method may be distributed among different parts or nodes of the network. For example, the steps obtaining 202, separating 204 and processing 208 may be performed in the receiver and the step of transforming 210 may be performed in another part of the network, such as in other parts of a RAN node or outside the RAN node. The apparatus may transform 210 the output signal from time domain into frequency domain by performing the transformation itself or by sending the output signal to another unit of the communication system that performs the transformation. The DFT that is performed may be a Fast Fourier Transformation, FFT. The FFT is, as indicated, a fast way of performing DFT, which most receivers use today to transform signals from time domain to frequency domain. The operation of transforming 210 from time domain into frequency domain by applying a DFT is a normal DFT operation performed in any receiver. In other words, the transforming operation 210 is no extra transforming compared to the one normally performed by a receiver. However, the resulting advantageous effect of attenuating the interference signal and keeping the payload signal almost unaffected is a purpose with the novel separating using a filter 204 and processing 208 that is achieved when the transforming 210 of the output signal from time domain to frequency domain has been performed. In the method one may choose and interchange which signal to call payload and which to call interference depending on which signal one wants to achieve as the output signal in the same time as the other signal is attenuated.

According to another embodiment, the processing 208 comprises multiplying the separated 204 payload signal with (1−W) to achieve the payload signal and a negative time-windowed payload signal, multiplying the obtained 202 signal with W to achieve a time-windowed payload signal and the time-windowed interference signal and adding the negative time-windowed payload signal and the separated 204 payload signal to the time-windowed payload signal and the time-windowed interference signal so as to achieve the output signal/first output signal comprising the payload signal and the time-windowed interference signal. This is a first alternative way of achieving an output signal comprising as signals only the payload signal and the time-windowed interference signal, see also FIG. 5a.

According to another embodiment, the first frequency band is for a radio access technology (RAT) with a first numerology and the second frequency band is for a radio access technology with a second numerology and that the window $W_p$ is adapted for the OFDM symbol width of the radio access technology with a first numerology and the window W is adapted for the OFDM symbol width of the radio access technology with a second numerology. The two RAT technologies can be the same or different.

According to another embodiment, the processing 208 comprises multiplying the separated 204 interference signal with W−1 to achieve the time-windowed interference signal and a negative interference signal, and adding the obtained signal, comprising the payload signal and the interference signal, with the time-windowed interference signal and the negative interference signal so as to achieve the output signal comprising the payload signal and the time-windowed interference signal. This is a second alternative way of achieving an output signal comprising as signals only the payload signal and the time-windowed interference signal, see also FIG. 6. This alternative has shown to have slightly improved performance in terms of out of band attenuation but slightly higher EVM for the carrier, compared to the embodiment above, also described in FIG. 5. This second embodiment is also slightly less complex than the embodiment of FIG. 5.

According to another embodiment, the processing 208 comprises multiplying the separated 204 interference signal with W to achieve the time-windowed interference signal, and adding the separated 204 payload signal to the time-windowed interference signal to achieve the output signal comprising the payload signal and the time-windowed interference signal. This is a third alternative way of achieving an output signal comprising as signals only the payload signal and the time-windowed interference signal. See also FIG. 7. The advantage with this embodiment is that performance can be improved without increased complexity by making the two filters less complex compared to a one filter solution as in the embodiments of FIGS. 5 and 6.

According to another embodiment, the processing (208) comprises multiplying the interference signal with $W_i$−1 to achieve the time windowed interference signal and the negative interference signal and adding the time windowed interference signal and the negative interference signal to the obtained signal comprising the payload and the interference signal to achieve the output signal comprising the payload signal and a time-windowed interference signal and/or adding a negative interference signal to the obtained signal comprising the payload signal and the interference signal to achieve the payload signal and multiplying the payload signal with $W_p$−1 to achieve a time windowed payload signal and a negative payload signal and adding to the time windowed payload signal and a negative payload signal the obtained signal comprising the payload signal and the interference signal to achieve the second output signal comprising the interference signal and a time-windowed payload signal. This is a fourth alternative way of achieving output signals comprising a first output signal comprising the payload signal and a time-windowed interference signal and/or a second output signal comprising the interference signal and a time-windowed payload signal. See also FIG. 12. The filter sorting out the interference signal is only on during the ramp up/ramp down phase of the window reducing the filtering time, and by this setup possible two output signals are achieved using only one filter.

According to another embodiment, the processing (208) comprises adding a negative payload signal to the obtained signal comprising the payload signal and the interference signal to achieve the interference signal and multiplying the interference signal with $W_i$−1 to achieve a time windowed interference signal and a negative interference signal and adding to the time windowed interference signal and the negative interference signal the obtained signal comprising the payload signal and the interference signal to achieve the first output signal comprising the payload signal and a time-windowed interference signal and/or multiplying the payload signal with $W_p$−1 to achieve the time windowed payload signal and a negative payload signal and adding the time windowed payload signal and a negative payload signal to the obtained signal comprising the payload signal and the interference signal to achieve the second output signal comprising the interference signal and a time-windowed payload signal. This is a fifth alternative way of achieving an output signal comprising a first output signal comprising the payload signal and a time-windowed interference signal and/or a second output signal comprising the interference signal and a time-windowed payload signal. See also FIG. 13. The filter sorting out the payload signal is only on during the ramp up/ramp down phase of the window reducing the filtering time, and by this setup possible two output signals are achieved using only one filter.

According to another embodiment, the processing (208) comprises multiplying the interference signal with $W_i$ to achieve a time windowed interference signal and adding the time windowed interference signal to the payload signal to achieve the output signal comprising the payload signal and the time-windowed interference signal and/or multiplying the payload signal with $W_p$ to achieve a time windowed payload signal and adding the time windowed payload signal to the interference signal to achieve the second output signal comprising the interference signal and a time-windowed payload signal. This is a sixth alternative way of achieving output signals comprising a first output signal comprising the payload signal and a time-windowed interference signal and/or a second output signal comprising the interference signal and a time-windowed payload signal. See also FIG. 14. Two filter are needed however the advantage is that the ripple requirements on the filters will be reduced and therefore the performance could be better and the number of filter taps in each filter is smaller than number of taps in the single filter cases. The two filters are less complex compared to a one filter solution as in the embodiments of FIGS. 12 and 13.

According to another embodiment, the method further comprises synchronizing 206 in time the obtained signal with the separated 204 payload signal or with the separated 204 interference signal, when they are un-synchronized. In case FIR-filters are used for the separating, the separated signal part, i.e. the payload signal or the interference signal, is delayed in the FIR-filter compared to the unfiltered obtained signal. In other words, the separated signal part is un-synchronized compared to the obtained signal. Therefore, in order to make them synchronized, the obtained signal is delayed with the same time as the delay of the FIR-filter. In case zero phase forward backward IIR filters are used, the separating step provides no delay and no synchronization by adding delay elements is necessary.

According to another embodiment, the time-window processing 208 comprises for each time window a connecting time during which the window function increases from 0 to 1, a steady time during which the window function is 1 and a disconnecting time during which the window function decreases from 1 to 0, and wherein the separating using a filter 204 and the time-window processing 208 is only performed during the connecting time and the disconnecting time. As the window function mainly is equal to 1, the window multiplications and the separating only needs to be performed when the window function is not equal to 1. This means that the calculations are significantly reduced compared to performing separating and window multiplications over the whole OFDM symbol. Also, the filter hardware may be used for other purposes during the steady time, such as for other algorithms in case it is a processor or for other signals received at e.g. different antennas.

Figure 10A:
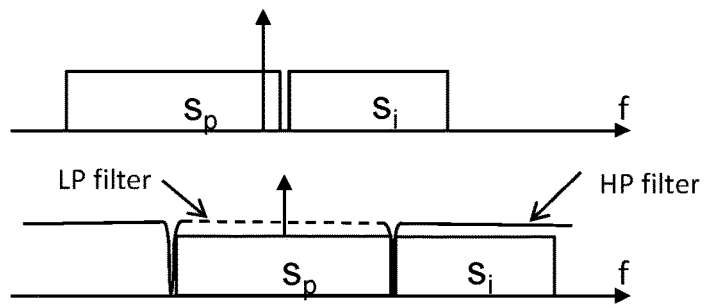
FIG. 10 a, 10b an 11 illustrates how the combined signal is frequency shifted so that one of the numerologies is located symmetrically in the band.
Figure 11:
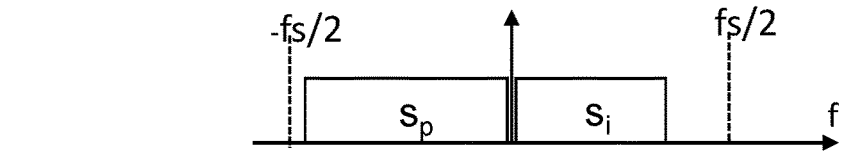
Figure 11:
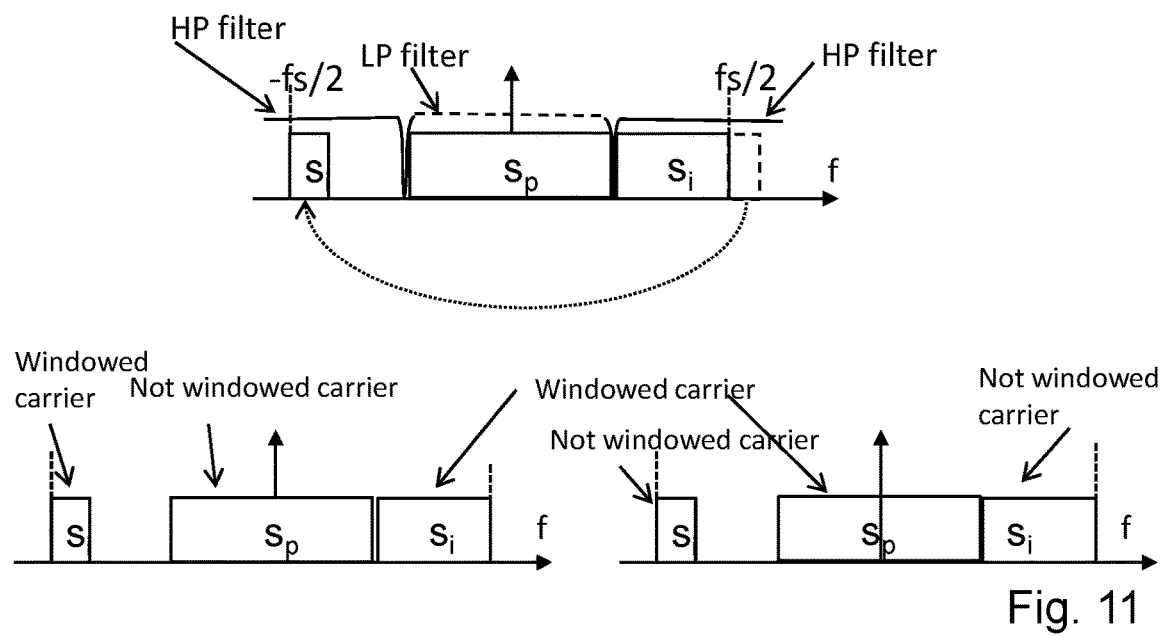

According to another embodiment the obtained signal (202) has a sample rate and a spectrum comprising the first numerology frequency band and the second numerology frequency band and wherein the transforming (203) further comprises frequency shift the obtained signal such that the first frequency band is located symmetrically around the center of the obtained signal's band and that the second frequency band is located further away from the center of the obtained signal's band than the first frequency band, or that the second frequency band is located symmetrically around the center of the obtained signal's band and that the first frequency band is located further away from the center of the obtained signal's band than the second frequency band, see FIGS. 10a and 11.

According to another embodiment wherein if the first numerology frequency band or the second numerology frequency band falls over half the sample rate of the obtained signal, the frequency shift creates a folding of that carrier frequency band to the other side of the obtained signal's spectrum and wherein the transforming (210) further comprises that the folded numerology frequency band is rearranged into a continuous numerology frequency band. The technology here presented uses the signals behavior and the fact that the folding effect will be handled by reordering after the FFT.

According to yet another embodiment, the method further comprises: after the obtaining 202, transforming 203 the obtained signal in time domain into frequency domain, performing the separating 204 of the payload signal from the interference signal in frequency domain, and transforming 205 the separated payload signal and/or the separated interference signal from frequency domain into time domain. The total number of operations needed for the method, when doing the separating in frequency domain instead of in time domain may be fewer even though such a transformation back 203 and forth 205 into frequency domain is added to the method. This is especially true when a long FIR-filter is needed, i.e. when the frequency separating is performed over a relatively long time, i.e. many samples. A long FIR-filter may be defined as having more than 30 coefficients.

Figure 6:
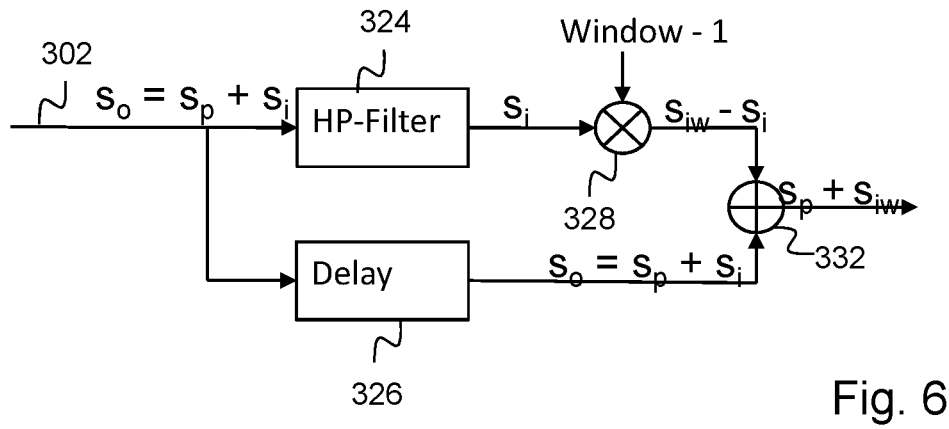
FIGS. 6, 7, 12, 13 and 14 are block diagrams of embodiments of an apparatus according to the technology here presented.
Figure 7:
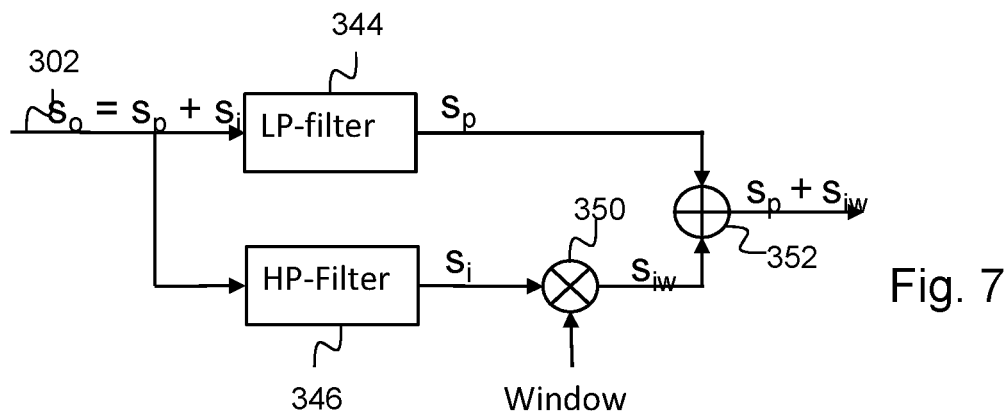

According to yet another embodiment, the separating 204 of the payload signal from the interference signal is performed by a forward-backward filtering procedure in an Infinite Impulse Response (IIR) filter. By such a method there is no delay induced in the filtering process compared to the non-filtered signal and thus no synchronization step is needed. A forward-backward filtering procedure in an IIR filter may also be known as Zero Phase IIR Forward-Backward filtering. In such a forward-backward filtering the obtained signal to be separated, e.g. so in FIGS. 5, 6 and 7, is led backwards and forwards in time through the IIR filter in order to achieve the separating 204 of the payload signal from the interference signal. An advantage to use IIR filters rather than FIR filters is that IIR filters typically requires less multiplications for the same filter performance.

According to another embodiment, the signal obtained 202 in time domain comprises a plurality of signals received at different antennas and/or in different frequency bands, each signal comprising a payload signal sent from a transmitter towards the receiver as well as an interference signal. Further, the method comprising separating the plurality of signals in time within an OFDM symbol time slot, before the separating using a filter. As the filter is only used a fraction of a symbol time slot for each signal, one filter equipment can be reused for two or more of the plurality of signals if the signals are spread in time within the symbol time slot. Consequently, less filter equipment is needed at the receiver.

In the following, embodiments for wireless OFDM-based communication networks, such as used in LTE and NR are described. In LTE and NR, there are special options to suppress unwanted emission and disturbance. Due to that the OFDM symbol consists of a sum of sinus-shaped subcarriers that only change phase and amplitude at the symbol borders, special possibilities occur to only filter at the symbol borders. Also see FIGS. 8a and 8c.

Windowing in a transmitter is a technique where, in this case, a time domain signal is multiplied, sample by sample, with a window function. It can result in less out of band signal power in a transmitter and less sensitivity to out of band disturbers in a receiver. It requires only one multiplication per sample in positions over time where the window function is not equal to one or zero.

Windowing in a transmitter can be used to reduce out-of-band emission. Windowing requires a cyclic prefix (CP) and/or a cyclic suffix (CS), which are cyclic extensions of an OFDM symbol. Windowing in the receiver is in some cases possible, provided that enough CP and CS are available. Windowing in the receiver is described for Very VDSL, which is DMT-based OFDM for DSL, in e.g. "Asynchronous Zipper [subscriber line duplex method]" by Sjöberg F. et al, published 1999 in IEEE International Conference on Communications Vol. 1, pp 231-235. Here the windowing is using both a part of the CP and the CS but also a part of the symbol. However, it is typically hard to fulfill out of band requirements for e.g. LTE only using windowing in a transmitter. Further, in the LTE and NR standards there is no windowing standardized. Also, the CP length is quite short, in particular for NR. There in not much windowing that can be done if the CP must be used. The CP is also needed for other purposes e.g. channel delay spread, internal time dispersion from filters and time synchronization uncertainty. Regarding receiver windowing in the radio case, the problem is that, in order to suppress a disturber, the window needs to be inside the OFDM symbol. At the same time, a window in the symbol will distort the payload signal. In cases with different numerologies the window $W_p$ is adapted for the OFDM symbol width of the signal called payload's numerology and another window $W_i$ is adapted for the OFDM symbol width of the signal called interference's numerology.

In order to solve these problems, a new solution, e.g. new algorithm that in this disclosure is called Frequency Selective Windowing (FSW) is suggested. FSW offers a way to reduce out of band disturber impact in OFDM receivers by windowing without using the CP. This means that there is no restriction of the window size enabling better performance than existing methods. The computational complexity is an order of magnitude lower than a standard FIR filter solution. This enables sharing of hardware resources and can reduce chip area and power consumption in a radio Application-Specific Integrated Circuit (ASIC).

FIGS. 5a, 6, 7, 12-14 illustrate six different embodiments of the apparatus of a receiver. In all six embodiments, a signal $s_o$ received from a transmitter is obtained at an input 302 of the apparatus. The obtained signal $s_o$ comprises a payload signal $s_p$ sent from the transmitter as well as added interference $s_i$ from e.g. signals sent by other transmitters. The payload signal is in a first frequency range and the interference is in a second frequency range. The obtained signal $s_o$ is or has been converted/shifted from radio frequency to baseband frequency, with the payload carrier frequency centered to zero.

Figure 10B:
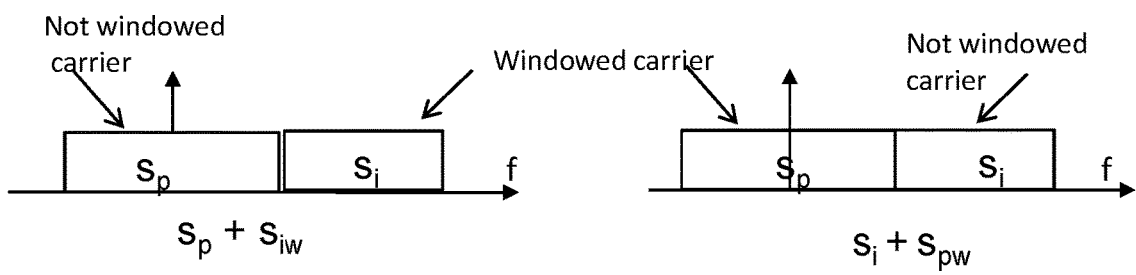

FIGS. 10a, 10b and 11 illustrate how a frequency shift is done in a case with two numerologies. In FIG. 10a the obtained signal $s_o=s_p+s_i$ (202) has a sample rate and a spectrum comprising a first numerology frequency band $s_p$ and a second numerology frequency band $s_i$. The transforming (203) further comprises frequency shift the obtained signal such that the first carrier frequency band is located symmetrically around the center of the obtained signal's band and that the second carrier frequency band is located further away from the center of the obtained signal's band than the first carrier frequency band, see FIG. 10a. If the second numerology frequency $s_i$ band falls over half the sample rate fs/2 of the obtained signal, the frequency shift creates a folding of that carrier frequency band to the other side of the obtained signal's spectrum. That is the frequency shift to center one carrier $s_p$ might create a folding of the other carrier $s_i$, see the middle figure of 11 where $s_i$ has folded. However, the folded carrier can be rearranged in frequency domain after the FFT. That is, the transforming (210), using the FFT, further comprises that the folded numerology frequency band is rearranged into a continuous numerology frequency band. Alternatively, in the case the interference signal is the desired output signal, the above applies with the second carrier frequency band located symmetrically around the center of the obtained signal's band—and the first frequency band is located further away from the center of the obtained signal's band than the second frequency band. The FIGS. 10 a, 10b and 11 show the numerologies $s_p$ and $s_i$ adjacent to each other however it is possible that they have a distance in-between their frequency bands.

Figure 5A:
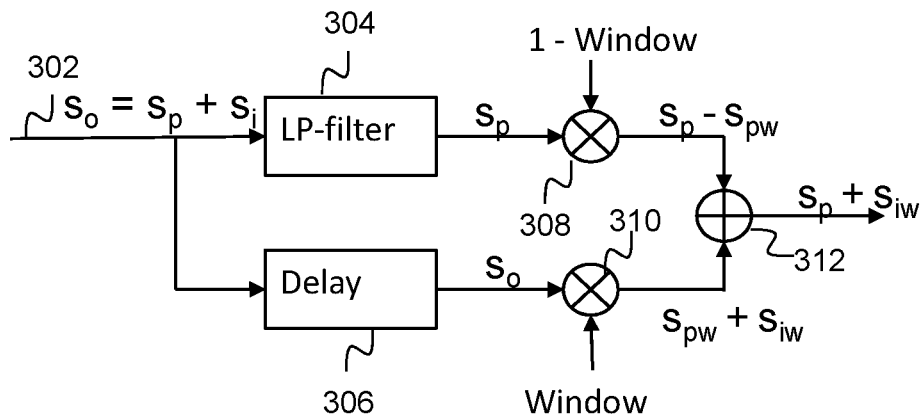
FIG. 5a is a block diagram of an embodiment of an apparatus according to the technology here presented.

According to the first embodiment as shown in FIG. 5a, the obtained signal so in baseband is sent to a low pass (LP) filter 304 where the payload signal $s_p$ is separated from the interference signal $s_i$. In other words, the interference signal is filtered out. Also, a version of the obtained signal $s_o$ in baseband the same delay as the filtered payload signal $s_p$. In other words, the payload signal $s_p$ is present in both versions, but the interference signal $s_i$ is attenuated in the filtered version. Then the filtered payload signal $s_p$ is sent to a first multiplier 308 where it is multiplied with (1−W), where W is a time window that is approximately an OFDM symbol wide, in order to achieve the filtered payload signal $s_p$ and a negative time windowed filtered payload signal $-s_{pw}$ on the output of the first multiplier 308. Further, the delayed version of the obtained signal $s_o$ is fed to a second multiplier 310 where it is multiplied with W in order to achieve a time windowed payload signal $s_{pw}$ and a time windowed interference signal $s_{iw}$. The resulting signals, i.e. the filtered payload signal $s_p$ and the negative time windowed filtered payload signal $-s_{pw}$ and the time windowed payload signal $s_{pw}$ and the time windowed interference signal $s_{iw}$ are fed to an adder 312 where they are added in order to achieve only the filtered payload signal $s_p$ and the time windowed interference signal $s_{iw}$ on the output of the adder 312. When performing FFT on such an output signal $s_p+s_{iw}$, the time windowed interference signal $s_{iw}$ will be attenuated and we will be left with an almost unaffected payload signal $s_p$.

Figure 5B:
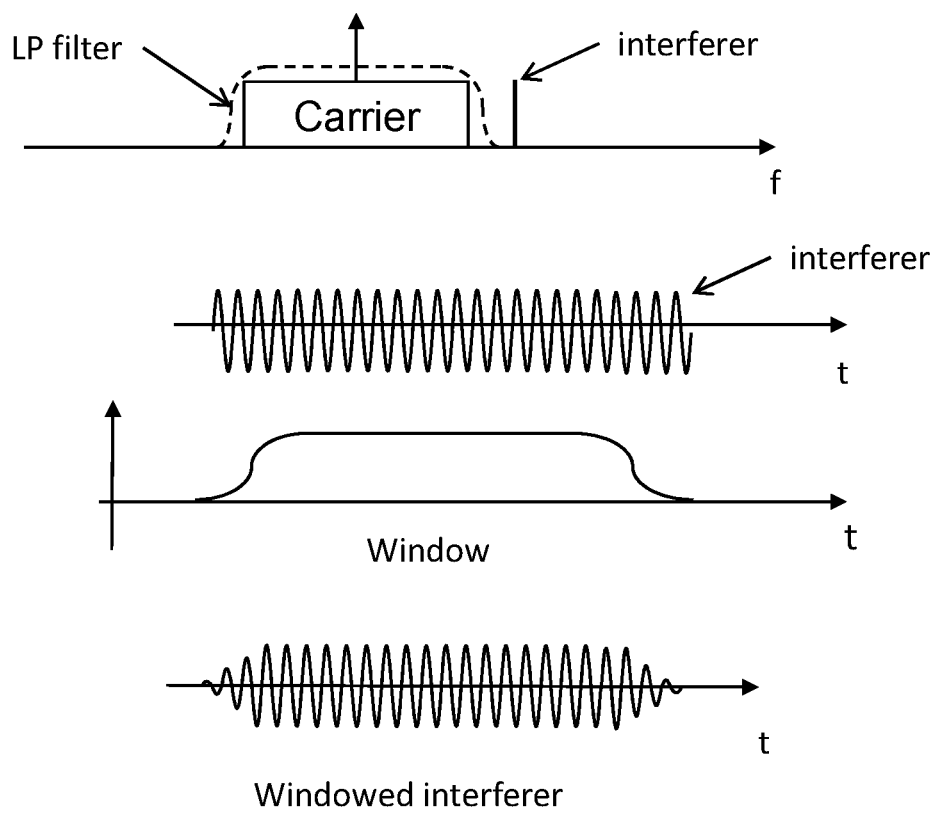

FIG. 5b shows in the uppermost diagram the LP-filter 304 separating the payload signal from the interference signal by letting the carrier frequencies, i.e. the payload signal $s_p$ through and filtering out the non-orthogonal interference signal $s_i$. The second upper diagram shows the interference signal $s_i$ before windowing. The second lowest diagram shows the time window function, which has a steady time when it is 1 most of the time, and which also has a connecting time when it rises from 0 to 1 and a disconnecting time when it falls from 1 to 0. The lowermost diagram shows the interference signal as it looks after being windowed $s_{iw}$.

According to the second embodiment as shown in FIG. 6, the obtained signal $s_o$ in baseband is sent to a high pass (HP) filter 324 where the interference signal $s_i$ is separated from the payload signal $s_p$. In other words, the payload signal is filtered out. Also, a version of the obtained signal $s_o$ in baseband is sent to a delay unit 326 in order to give this version of the obtained signal $s_o$ the same delay as the filtered interference signal $s_i$. In other words, the interference signal $s_i$ is present in both versions, but the payload signal $s_p$ is attenuated in the filtered version. Then the filtered interference signal $s_i$ is sent to a multiplier 328 where it is multiplied with (W−1) in order to achieve a time windowed interference signal $s_{iw}$ and a negative interference signal $-s_i$ on the output of the multiplier 328. Further, the delayed version of the obtained signal $s_o$ is fed to an adder 332 where it is added with the time windowed interference signal $s_{iw}$ and the negative interference signal $-s_i$. Then the following calculation is done in the adder 332: $s_p+s_i+s_{iw}-s_i$ and on the output of the adder 332 only the filtered payload signal $s_p$ and the time windowed interference signal $s_{iw}$ appears. When performing FFT on such an output signal $s_p+s_{iw}$, the time windowed interference signal $s_{iw}$ will almost disappear and we will be left with an unaffected payload signal $s_p$. This second embodiment has shown to have slightly improved performance in terms of out of band attenuation but slightly higher EVM for the carrier, compared to the first embodiment. The second embodiment is also slightly less complex than the first embodiment.

According to the third embodiment as shown in FIG. 7, the obtained signal $s_o$ in baseband is sent to an LP-filter 344 where the payload signal $s_p$ is separated from the interference signal $s_i$. In other words, the interference signal is filtered out. Also, a version of the obtained signal $s_o$ in baseband is sent to a HP-filter 346 where the interference signal $s_i$ is separated from the payload signal $s_p$. In other words, the payload signal is filtered out. Then the filtered interference signal $s_i$ is sent to a multiplier 350 where it is multiplied with W in order to achieve a time windowed interference signal $s_{iw}$ on the output of the multiplier 350. Further, the filtered payload signal $s_p$ is added with the time windowed interference signal $s_{iw}$ in an adder 352 in order to achieve on the output of the adder 332 only the filtered payload signal $s_p$ and the time windowed interference signal $s_{iw}$ appears. When performing FFT on such an output signal $s_p+s_{iw}$, the time windowed interference signal $s_{iw}$ will be attenuated and we will be left with an unaffected payload signal $s_p$.

Figure 12:
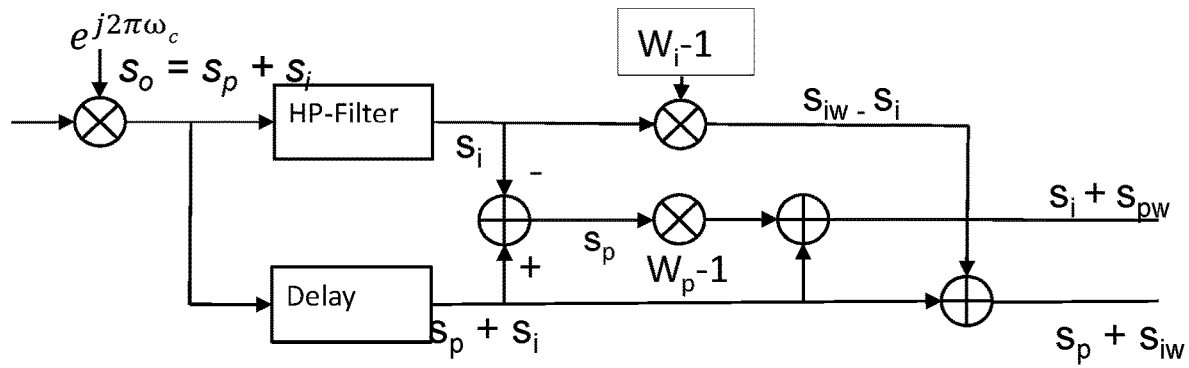

According to the fourth embodiment as shown in FIG. 12. The obtained signal is the frequency shifted, so that one of the numerologies is located symmetrically in the band, this is called signal in baseband. The obtained signal so is sent to an HP-filter where the interference signal $s_i$ is separated from the payload signal $s_p$. In other words, the payload signal is filtered out. Also, a version of the obtained signal $s_o$ in baseband is sent to a delay unit in order to give this version of the obtained signal $s_o$ the same delay as the filtered interference signal $s_i$. In other words, the interference signal $s_i$ is present in both versions, but the payload signal $s_{ip}$ is attenuated in the filtered version. Then the filtered interference signal $s_i$ is sent to a multiplier where it is multiplied with $(W_i-1)$ in order to achieve a time windowed interference signal $s_{iw}$ and a negative interference signal $-s_i$ on the output of the multiplier. This output of the multiplier is fed to an adder where it is added with the delayed version of the obtained signal. Then the following calculation is done in the adder: $s_{iw}-s_i+s_p+s_i$ and on the output of the adder the (first) output signal appears comprising only the payload signal $s_p$ and a windowed interference signal $s_{iw}$. When performing FFT on such an output signal $s_p+s_{iw}$, the time windowed interference signal $s_{iw}$ will almost disappear and we will be left with an unaffected payload signal $s_p$. Further according to the fourth embodiment, the delayed version of the obtained signal $s_o$ is fed to an adder where it is added with a negative version of the interference signal $-s_i$. Then the following calculation is done in the adder: $s_p+s_i+(-s_i)$ and on the output of the adder only the payload signal $s_p$ appears. The output of the adder $s_p$ is sent to a multiplier where it is multiplied with $(W_p-1)$ in order to achieve a time windowed payload signal $s_{pw}$ and a negative payload signal $-s_p$ on the output of the multiplier. This output of the multiplier is fed to an adder where it is added with the delayed version of the obtained signal. Then the following calculation is done in the adder: $s_{pw}-s_p+s_p+s_i$ and on the output of the adder the second output signal appears comprising only the interference signal $s_i$ and a windowed payload signal $s_{pw}$. When performing FFT on such an output signal $s_i+s_{pw}$, the time windowed payload signal $s_{pw}$ will almost disappear and we will be left with an unaffected interference signal $s_i$. The advantage is that the ripple requirements on the filters will be reduced, the requirements on the passband of the filter is reduced and therefore the performance could be better and number of filter taps in each filter is smaller than number of taps in the continuously running filter prior art cases.

Figure 13:
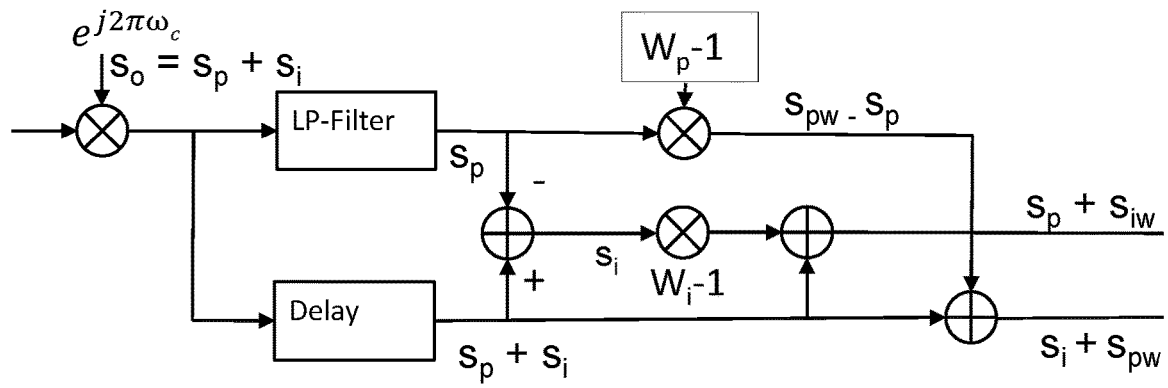

According to the fifth embodiment as shown in FIG. 13 The obtained signal is the frequency shifted, so that one of the numerologies is located symmetrically in the band. The obtained signal so is sent to an LP-filter where the payload signal $s_p$ is separated from the interference signal $s_i$. In other words, the interference signal is filtered out. Also, a version of the obtained signal $s_o$ in baseband is sent to a delay unit in order to give this version of the obtained signal so the same delay as the filtered payload signal sp. In other words, the payload signal $s_p$ is present in both versions, but the interference signal $s_i$ is attenuated in the filtered version. Then the filtered payload signal $s_p$ is sent to a multiplier where it is multiplied with $(W_p-1)$ in order to achieve a time windowed payload signal $s_{pw}$ and a negative payload signal $-s_p$ on the output of the multiplier. This output of the multiplier is fed to an adder where it is added with the delayed version of the obtained signal. Then the following calculation is done in the adder: $s_{pw}-s_p+s_p+s_i$ and on the output of the adder the (second) output signal appears comprising only the interference signal $s_i$ and a windowed payload signal $s_{pw}$. When performing FFT on such an output signal $s_i+s_{pw}$, the time windowed payload signal $s_{pw}$ will almost disappear and we will be left with an unaffected interference signal $s_i$. Further, the delayed version of the obtained signal so is fed to an adder where it is added with the negative payload signal $-sp$. Then the following calculation is done in the adder: $s_p+s_i+(-s_p)$ and on the output of the adder only the interference signal $s_i$ appears. The output of the adder si is sent to a multiplier where it is multiplied with $(W_i-1)$ in order to achieve a time windowed interference signal $s_{iw}$ and a negative interference signal $-s_i$ on the output of the multiplier. This output of the multiplier is fed to an adder where it is added with the delayed version of the obtained signal. Then the following calculation is done in the adder: $s_{iw}-s_i+s_p+s_i$ and on the output of the adder the (first) output signal appears comprising only the payload signal $s_p$ and a windowed interference signal $s_{iw}$. When performing FFT on such an output signal $s_p+s_{iw}$, the time windowed interference signal $s_{iw}$ will almost disappear and we will be left with an unaffected payload signal $s_p$. This fifth embodiment has shown to be equivalent to the fourth embodiment.

Figure 14:
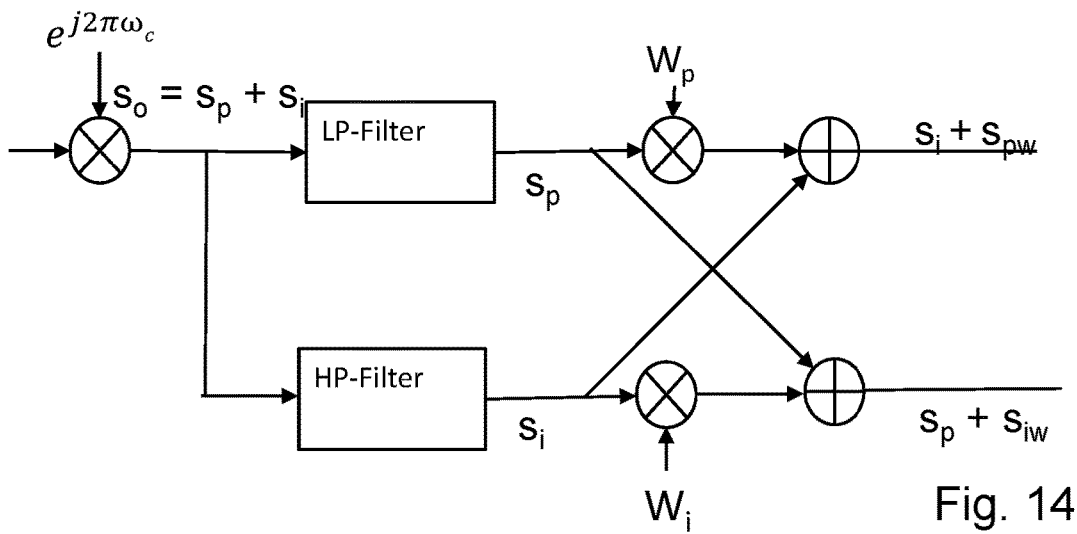

According to the sixth embodiment as shown in FIG. 14 the obtained signal is the frequency shifted, so that one of the numerologies is located symmetrically in the band, this is called baseband. The obtained signal $s_o$ is sent to an LP-filter where the payload signal $s_p$ is separated from the interference signal $s_i$. In other words, the interference signal is filtered out, leaving a LP-filtered payload signal $s_p$. Also, the obtained signal so is sent to an HP-filter where the interference signal $s_i$ is separated from the payload signal $s_p$. In other words, the payload signal is filtered out, leaving a HP-filtered interference signal $s_i$. Then the LP-filtered payload $s_p$ signal is sent to a multiplier where it is multiplied with $W_p$ in order to achieve a time windowed payload signal $s_{pw}$. This output of the multiplier $s_{pw}$ is fed to an adder where it is added with the HP-filtered interference signal $s_i$. Then the following calculation is done in the adder: $s_{pw}+s_i$ and on the output of the adder the second output signal appears comprising only the interference signal $s_i$ and a windowed payload signal $s_{pw}$. When performing FFT on such an output signal $s_i+s_{pw}$, the time windowed payload signal $s_{pw}$ will almost disappear and we will be left with an unaffected interference signal $s_i$. Further the HP-filtered interference signal $s_i$ is sent to a multiplier where it is multiplied with $W_i$ in order to achieve a time windowed interference signal $s_{iw}$. This output of the multiplier $s_{iw}$ is fed to an adder where it is added with the LP-filtered payload signal $s_p$. Then the following calculation is done in the adder: $s_{iw}+s_p$ and on the output of the adder the (first) output signal appears comprising only the payload signal $s_p$ and a windowed interference signal $s_{iw}$. When performing FFT on such an output signal $s_p+s_{iw}$, the time windowed interference signal $s_{iw}$ will almost disappear and we will be left with an unaffected interference signal $s_p$. The advantage is that the ripple requirements on the filters will be reduced and therefore the performance could be better and the number of filter taps in each filter is smaller than number of taps in the single filter cases.

As discussed, the window function (W, $W_p$, $W_i$) is equal to 1 except in the beginning and the end of the time window, here called connecting time and disconnecting time. As this is the case, the windowing multiplications as well as the separating by a filter only need to be performed here. This corresponds to a small fraction of the total time and means that the calculations are significantly reduced compared to a filter running continuously. This is illustrated in FIG. 8a where the separating by filters 402 is only performed at the connection time and the disconnecting time. FIG. 8a further shows an embodiment where the time window 404 starts within a CP and ends before the consecutive CP starts. The time window is one OFDM symbol long but in this embodiment, it starts before the OFDM symbol has started and ends before the OFDM symbol has ended. The reason for such a time shift is that the OFDM symbol may be distorted at or close to the symbol borders, e.g. due to filters in the system or due to interference in the radio channel. In order to avoid such symbol distortions at the disconnecting time and connecting time, where the multiplication is performed, the time window can be shifted in time so that the connecting and disconnecting time do not occur at the symbol borders. In such cases the delay caused by using a part of the Cyclic prefix must be compensated for each subcarrier. This is done in OFDM receivers as a standard method not further described in this application. According to another embodiment, the time window may start at the beginning of the OFDM symbol and end at the end of the symbol.

To benefit from the fact that the filter is running only a fraction of the total time, the filter resources can be utilized by being shared between carriers and/or antennas. However, this requires that the separating using a filter is spread over time for the different carriers or antennas that are to share filter resources. In a radio today all symbols are aligned in time. However, there are also other calculations that use a shared resource e.g. the FFT calculations. This means that somewhere in the receiver, the different carriers or antennas need to be sequenced in order to share common resources. As the channel separation and windowing presented would typically be the last operation in the receiver before the FFT, it would be possible to do the sequencing before the channel filter and then the hardware would be possible to share.

According to another embodiment, the separating using a filter, which has been described as being performed in time domain, may instead be performed in frequency domain. This could be an alternative if a quite long filter would be required. The operations are in that case one FFT of twice the length of the filter response, a multiplication with the desired frequency response followed by an Inverse FFT (IFFT). The total amount of operations can in this case be smaller than the time domain implementation.

Different type of window functions may be used for implementing the time window. The most common window function is a Raised Cosine (RC) window. However, other windows can be used that might perform better. One example of such a window that may perform better is the window defined by the equations shown below. It has shown to have better attenuation of out-of-band signals than the Raised Cosine window. The Fourier transformation of this window function reached lower values than the RC-window. In other words, signals outside the carrier frequency will be more attenuated after a Fourier transformation of the shown window function than when using the RC Window function. The constant c is typically in the order of 2.9. The integral function is well-known from statistics as the Gaussian distribution function.

$$\begin{cases} w(x) = \int_{-c}^{c(2x/x_1 - 1)} e^{-t^2} dt & 0 < x < x_1 \\ w(x) = 1 & x_1 < x < x_2 \\ w(x) = 1 - \int_{-c}^{2c\left(\frac{x-x_2}{x_3-x_2} - 1\right)} e^{-t^2} dt & x_2 < x < x_3 \end{cases}$$

According to another embodiment, the above described FSW algorithm can be combined with continuous filtering to improve the suppression of the interfering signal. The continuous filter can then have reduced complexity.

The above embodiments of the detailed description have been especially described for wireless OFDM-based communication networks. However, they are also applicable for any other multi carrier-based communication system implemented using FFT transforms.

Figure 9A:
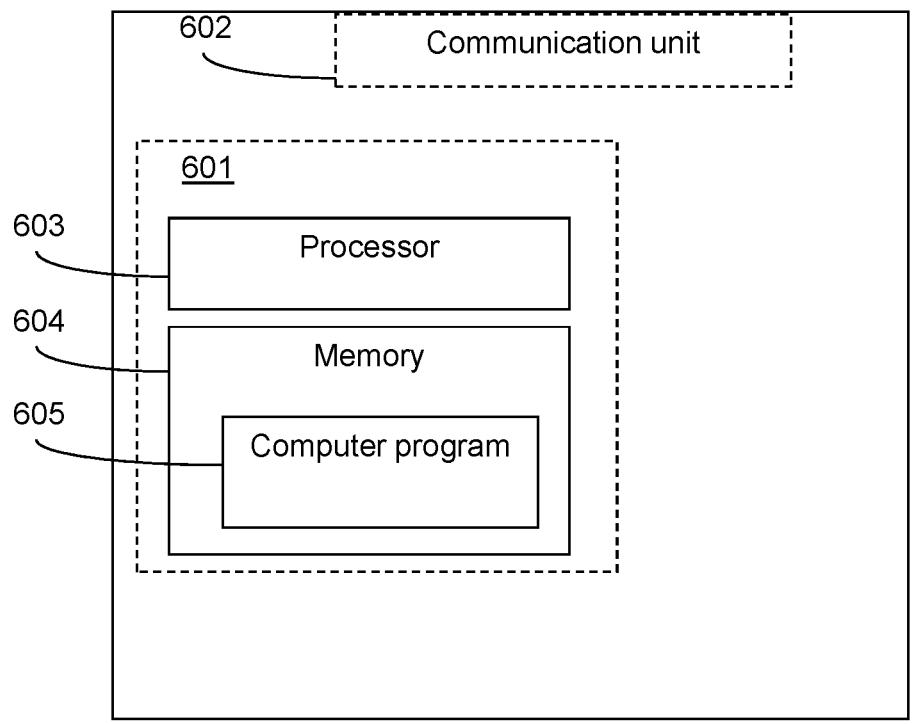
FIGS. 9a and 9b are block diagrams illustrating an apparatus according to possible embodiments of the technology here presented.
Figure 9B:
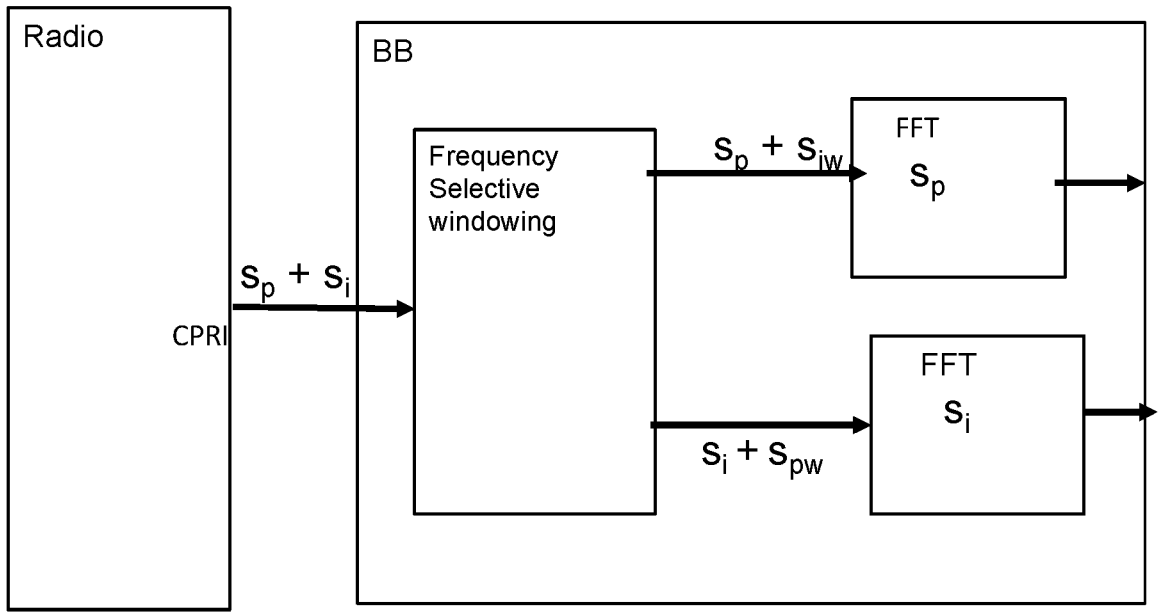

FIG. 9, in conjunction with FIG. 1, describes an apparatus 600 operable in an OFDM-based communication network 100, configured for handling signals in the communication network received at a receiver 120. The apparatus 600 comprises a processing circuitry 603 and a memory 604. The memory contains instructions executable by said processing circuitry, whereby the apparatus 600 is operative for obtaining a signal in time domain, the signal comprising a payload signal sent from a transmitter 110 towards the receiver 120 as well as an interference signal, the payload signal residing in a first frequency band and the interference signal residing in a second frequency band outside the first frequency band, separating the payload signal from the interference signal using a filter, and processing (208) the separated payload signal with a time window ($W, W_p$), or the separated interference signal with a time window, ($W, W_i$), or processing both the separated payload signal with a window ($W, W_p$) and the obtained signal with a window ($W, W_i$), the window ($W, W_p, W_i$) being substantially an OFDM symbol wide, so as to achieve a output signal/first output signal comprising the payload signal and a time-windowed interference signal and/or to achieve a second output signal comprising the interference signal and a time-windowed payload signal.

According to one alternative, the apparatus 600 is a part of the receiver 120. According to a second alternative, the apparatus is distributed among different parts or nodes of the network.

According to an alternative, the apparatus (600) according further comprising that the first frequency band is for a radio access technology (RAT) with a first numerology and the second frequency band is for a radio access technology with a second numerology and that the window $W_p$ is adapted for the OFDM symbol width of the radio access technology with the first numerology and the window $W_i$ is adapted for the OFDM symbol width of the radio access technology with the second numerology.

According to an embodiment, the apparatus 600 is further operative for transforming the output signal(s) from time domain into frequency domain by applying a DFT to the output signal. In this embodiment, the apparatus may be distributed as in the second alternative above so that the transforming is performed in another part of the network different from the receiver.

According to another embodiment, the apparatus 600 is operative for performing the processing by multiplying the filtered payload signal with (1−W) to achieve the payload signal and a negative time-windowed payload signal, multiplying the obtained signal with W to achieve a time-windowed payload signal and the time-windowed interference signal, and adding the negative time-windowed payload signal and the filtered payload signal to the time-windowed payload signal and the time-windowed interference signal so as to achieve the output signal comprising the payload signal and the time-windowed interference signal.

According to another embodiment, the apparatus 600 is operative for performing the processing by multiplying the filtered interference signal with W−1 to achieve the time-windowed interference signal and a negative interference signal, and adding the obtained signal, comprising the payload signal and the interference signal, with the time-windowed interference signal and the negative interference signal so as to achieve the output signal comprising the payload signal and the time-windowed interference signal and/or; adding a negative interference signal to the obtained signal comprising the payload signal and the interference signal to achieve the payload signal and multiplying the payload signal with $W_p-1$ to achieve a time windowed payload signal and a negative payload signal and adding to the time windowed payload signal and a negative payload signal the obtained signal comprising the payload signal and the interference signal to achieve the second output signal comprising the interference signal and a time-windowed payload signal.

According to another embodiment, the apparatus 600 is operative for performing the processing by multiplying the separated interference signal with W to achieve the time-windowed interference signal, and adding the separated payload signal to the time-windowed interference signal to achieve the output signal comprising the payload signal and the time-windowed interference signal and/or multiplying the payload signal with $W_p$ to achieve a time windowed payload signal and adding the time windowed payload signal to the interference signal to achieve the second output signal comprising the interference signal and a time-windowed payload signal.

According to another embodiment the apparatus is operative for adding a negative payload signal to the obtained signal comprising the payload signal and the interference signal to achieve the interference signal and multiplying the interference signal with $W_i-1$ to achieve a time windowed interference signal and a negative interference signal and adding to the time windowed interference signal and the negative interference signal the obtained signal comprising the payload signal and the interference signal to achieve the output signal comprising the payload signal and a time-windowed interference signal and/or; multiplying the payload signal with $W_p-1$ to achieve the time windowed payload signal and a negative payload signal and adding the time windowed payload signal and a negative payload signal to the obtained signal comprising the payload signal and the interference signal to achieve the second output signal comprising the interference signal and a time-windowed payload signal.

According to yet another embodiment, the apparatus 600 is further operative for synchronizing in time the obtained signal with the separated payload signal or with the separated interference signal, when they are un-synchronized.

According to still another embodiment, the time-window processing comprises for each time window a connecting time during which the window function increases from 0 to 1, a steady time during which the window function is 1 and a disconnecting time during which the window function decreases from 1 to 0. Further, the apparatus is operative for performing the separating using a filter and the processing only during the connecting time and the disconnecting time.

According to another embodiment the apparatus is further operative for, wherein the obtained signal (202) has a sample rate and a spectrum comprising the first numerology frequency band and the second numerology frequency band and wherein the transforming (203) further comprises frequency shift the obtained signal such that the first frequency band is located symmetrically around the center of the obtained signal's band and that the second frequency band is located further away from the center of the obtained signal's band than the first frequency band, or that the second frequency band is located symmetrically around the center of the obtained signal's band and that the first frequency band is located further away from the center of the obtained signal's band than the second frequency band. Wherein if the first numerology frequency band or the second numerology frequency band falls over half the sample rate of the obtained signal, the frequency shift creates a folding of that frequency band to the other side of the obtained signal's spectrum and wherein the transforming (210) further comprises that the folded numerology frequency band is rearranged into a continuous numerology frequency band.

According to yet another embodiment, the apparatus 600 is further operative for, after the obtaining, transforming the obtained signal in time domain into frequency domain, performing the separating using a filter of the payload signal from the interference signal in frequency domain, and transforming the separated payload signal and/or the separated interference signal from frequency domain into time domain.

According to still another embodiment, the apparatus 600 is operative for performing the separating using a filter of the payload signal from the interference signal by a forward-backward filtering procedure in an Infinite Impulse Response, IIR filter.

According to other embodiments, the apparatus 600 may further comprise a communication unit 602, which may be considered to comprise conventional means for wireless or wireline communication with the transmitter, such as a transceiver for wireless transmission and reception of signals. The communication unit 602 may also comprise conventional means for communication with any other node of the communication network 100. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the apparatus 600 to perform the steps described in any of the described embodiments of the apparatus 600 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the apparatus 600 has access via the communication unit 602. The computer program 605 may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by an apparatus for handling signals in an Orthogonal Frequency Division Multiplex (OFDM)-based communication network received at a receiver, the method comprising:
    obtaining a signal in time domain, the signal comprising a payload signal sent from a transmitter towards the receiver as well as an interference signal, the payload signal residing in a first frequency band and the interference signal residing in a second frequency band outside the first frequency band;
    separating the payload signal from the interference signal using a filter, and
    processing the separated payload signal with a first time window, or processing the separated interference signal with a second time window, or processing both the separated payload signal with a first time window and the obtained signal with a second time window, each time window being substantially an OFDM symbol wide, so as to achieve an output signal or first output signal comprising the payload signal and a time-windowed interference signal and/or to achieve a second output signal comprising the interference signal and a time-windowed payload signal,
    wherein the processing with the first time window and/or the second time window comprises, for each time window, a connecting time during which a window function for the time window increases from 0 to 1, a steady time during which the window function is 1 and a disconnecting time during which the window function decreases from 1 to 0, and wherein the separating using a filter and the processing is only performed during the connecting time and the disconnecting time.

2. The method of claim 1, further comprising that the first frequency band is for a radio access technology (RAT) with a first numerology and the second frequency band is for a radio access technology with a second numerology and that the first time window is adapted for the OFDM symbol width of the radio access technology with a first numerology and the second time window is adapted for the OFDM symbol width of the radio access technology with the second numerology.

3. The method of claim 2, further comprising:
    transforming the output signal or signals from time domain into frequency domain by applying a Discrete Fourier Transform, DFT, to the output signal or signals.

4. The method of claim 3 wherein the processing comprises:
    multiplying the separated payload signal with 1−W to achieve the payload signal and a negative time-windowed payload signal, where W is the window function for the first time window;
    multiplying the obtained signal with W to achieve a time-windowed payload signal and the time-windowed interference signal, and
    adding the negative time-windowed payload signal and the separated payload signal to the time-windowed payload signal and the time-windowed interference signal so as to achieve the output signal comprising the payload signal and the time-windowed interference signal.

5. The method of claim 1, wherein the processing comprises
    multiplying the separated interference signal with W−1 to achieve the time-windowed interference signal and a negative interference signal, wherein W is the window function for the second time window, and
    adding the obtained signal, comprising the payload signal and the interference signal, with the time-windowed interference signal and the negative interference signal so as to achieve the output signal or first output signal comprising the payload signal and the time-windowed interference signal and/or;
    adding a negative interference signal to the obtained signal comprising the payload signal and the interference signal to achieve the payload signal and
    multiplying the payload signal with $W_p-1$ to achieve a time windowed payload signal and a negative payload signal, wherein $W_p$ is the window function for the first time window, and
    adding to the time windowed payload signal and the negative payload signal the obtained signal comprising the payload signal and the interference signal to achieve the second output signal comprising the interference signal and the time-windowed payload signal.

6. The method of claim 1, wherein the processing comprises:
    multiplying the separated interference signal with W to achieve the time-windowed interference signal, wherein W is the window function for the second time window, and
    adding the separated payload signal to the time-windowed interference signal to achieve the output signal or first output signal comprising the payload signal and the time-windowed interference signal and/or;
    multiplying the payload signal with $W_p$ to achieve the time windowed payload signal, wherein $W_p$ is the window function for the first time window, and
    adding the time windowed payload signal to the interference signal to achieve the second output signal comprising the interference signal and a time-windowed payload signal.

7. An apparatus operable in an OFDM-based communication network, configured for handling signals in the communication network received at a receiver, the apparatus comprising a processing circuitry and a memory, said memory containing instructions executable by said processing circuitry, whereby the apparatus is configured to:
    obtain a signal in time domain, the signal comprising a payload signal sent from a transmitter towards the receiver as well as an interference signal, the payload signal residing in a first frequency band and the interference signal residing in a second frequency band outside the first frequency band;
    separate the payload signal from the interference signal using a filter, and process the separated payload signal with a first time window, or process the separated interference signal with a second time window, or process both the separated payload signal with a first time window and the obtained signal with a second time window, each time window being substantially an OFDM symbol wide, so as to achieve an output signal or first output signal comprising the payload signal and a time-windowed interference signal and/or to achieve a second output signal comprising the interference signal and a time-windowed payload signal, wherein the processing with the first time window and/or second time window comprises, for each time window, a connecting time during which a window function for the time window increases from 0 to 1, a steady time during which the window function is 1 and a disconnecting time during which the window function decreases from 1 to 0, and wherein the apparatus is operative for performing the separating using a filter and the processing only during the connecting time and the disconnecting time.

8. The apparatus of claim 7, wherein the first frequency band is for a radio access technology (RAT) with a first numerology and the second frequency band is for a radio access technology with a second numerology and that the first time window is adapted for the OFDM symbol width of the radio access technology with the first numerology and the second time window is adapted for the OFDM symbol width of the radio access technology with the second numerology.

9. The apparatus of claim 7, further being configured to: transform the output signal or signals from time domain into frequency domain by applying a DFT to the output signal or signals.

10. The apparatus of claim 7, being configured to perform the processing by:
multiplying the filtered payload signal with 1−W to achieve the payload signal and a negative time-windowed payload signal, where W is the window function for the first time window;
multiplying the obtained signal with W to achieve a time-windowed payload signal and the time-windowed interference signal, and
adding the negative time-windowed payload signal and the filtered payload signal to the time-windowed payload signal and the time-windowed interference signal so as to achieve the output signal comprising the payload signal and the time-windowed interference signal.

11. The apparatus of claim 7, being configured to perform the processing by:
multiplying the separated interference signal with W−1 to achieve the time-windowed interference signal and a negative interference signal, wherein W is the window function for the second time window, and
adding the obtained signal, comprising the payload signal and the interference signal, with the time-windowed interference signal and the negative interference signal so as to achieve the output signal or first output signal comprising the payload signal and the time-windowed interference signal and/or
adding a negative interference signal to the obtained signal comprising the payload signal and the interference signal to achieve the payload signal and
multiplying the payload signal with $W_p$−1 to achieve a time windowed payload signal and a negative payload signal, wherein $W_p$ is the window function for the first time window, and
adding to the time windowed payload signal and a negative payload signal the obtained signal comprising the payload signal and the interference signal to achieve the second output signal comprising the interference signal and a time-windowed payload signal.

12. The apparatus of claim 7, being configured to perform the processing by:
multiplying the separated interference signal with W to achieve the time-windowed interference signal, wherein W is the window function for the second time window, and
adding the separated payload signal to the time-windowed interference signal to achieve the output signal comprising the payload signal and the time-windowed interference signal and/or;
multiplying the payload signal with $W_p$ to achieve a time windowed payload signal, wherein $W_p$ is the window function for the first time window, and
adding the time windowed payload signal to the interference signal to achieve the second output signal comprising the interference signal and a time-windowed payload signal.

13. The apparatus of claim 7, being configured to perform the processing by:
adding a negative payload signal to the obtained signal comprising the payload signal and the interference signal to achieve the interference signal and
multiplying the interference signal with $W_i$−1 to achieve a time windowed interference signal and a negative interference signal wherein $W_i$ is the window function for the second time window and
adding to the time windowed interference signal and the negative interference signal the obtained signal comprising the payload signal and the interference signal to achieve the first output signal comprising the payload signal and a time-windowed interference signal and/or;
multiplying the payload signal with $W_p$−1 to achieve the time windowed payload signal and a negative payload signal, wherein $W_p$ is the window function for the first time window, and
adding the time windowed payload signal and a negative payload signal to the obtained signal comprising the payload signal and the interference signal to achieve the second output signal comprising the interference signal and a time-windowed payload signal.

14. The apparatus of claim 7, being configured to: synchronize in time the obtained signal with the separated payload signal or with the separated interference signal, when they are un-synchronized.

15. The apparatus of claim 7, wherein the obtained signal has a sample rate and a spectrum comprising the first numerology frequency band and the second numerology frequency band and wherein the apparatus is configured to perform the transforming by frequency shifting the obtained signal such that the first frequency band is located symmetrically around the center of the obtained signal's band and such that the second frequency band is located further away from the center of the obtained signal's band than the first frequency band, or such that the second frequency band is located symmetrically around the center of the obtained signal's band and such that the first frequency band is located further away from the center of the obtained signal's band than the second frequency band.

16. The apparatus of claim 7, being configured to perform the processing by: if the first numerology frequency band or the second numerology frequency band falls over half the sample rate of the obtained signal, the frequency shift creates a folding of that frequency band to the other side of the obtained signal's spectrum and wherein the transforming further comprises that the folded numerology frequency band is rearranged into a continuous numerology frequency band.

17. The apparatus of claim 7, being configured to perform the processing by:
   after the obtaining, transforming the obtained signal in time domain into frequency domain,
   performing the separating using a filter of the payload signal from the interference signal in frequency domain, and
   transforming the separated payload signal and/or the separated interference signal from frequency domain into time domain.

18. The apparatus of claim 7, being configured to perform the separating using a filter of the payload signal from the interference signal by a forward-backward filtering procedure in an Infinite Impulse Response (IIR) filter.

19. A non-transitory computer-readable medium comprising, stored thereupon, a computer program comprising instructions that, when executed by at least one processing circuitry of an apparatus of an OFDM-based communication network, configured for handling signals in the communication network received at a receiver, causes the apparatus to perform the following steps:
   obtaining a signal in time domain, the signal comprising a payload signal sent from a transmitter towards the receiver as well as an interference signal, the payload signal residing in a first frequency band and the interference signal residing in a second frequency band outside the first frequency band;
   separating the payload signal from the interference signal using a filter, and processing the separated payload signal with a first time window, or processing the separated interference signal with a second time window, or processing both the separated payload signal with a first time window and the obtained signal with a second time window, each time window being substantially an OFDM symbol wide, so as to achieve an output signal or first output signal comprising the payload signal and a time-windowed interference signal and/or to achieve a second output signal comprising the interference signal and a time-windowed payload signal, wherein the processing with the first time window and/or second time window comprises, for each time window, a connecting time during which a window function for the time window increases from 0 to 1, a steady time during which the window function is 1 and a disconnecting time during which the window function decreases from 1 to 0, and wherein the separating using a filter and the processing is only performed during the connecting time and the disconnecting time.

* * * * *